United States Patent [19]

French

[11] 3,766,587
[45] Oct. 23, 1973

[54] SCRAPER CUPS
[75] Inventor: Hartley A. French, Willowdale, Ontario, Canada
[73] Assignee: Trans-Canada Pipe Lines Limited, Toronto, Ontario, Canada
[22] Filed: Mar. 2, 1972
[21] Appl. No.: 231,135

[52] U.S. Cl. ............................ 15/104.06 R, 137/268
[51] Int. Cl. ............................................. B08b 9/04
[58] Field of Search ............ 15/104.06 R, 104.06 A, 15/104.06 B, 3.5; 137/268

[56] References Cited
UNITED STATES PATENTS
1,644,436  10/1927  Locke .................................... 4/256
2,042,372  5/1936  Watson .................................. 4/255
2,066,773  1/1937  Felice .................................... 4/255

Primary Examiner—Edward L. Roberts
Attorney—R. Gordon Waldie

[57] ABSTRACT

This invention provides a scraper cup for use with a pipeline pig, the scraper cup being generally dished or cotyloid in shape, and having generally a thicker wall to one side of its geometric centre than to the other side of its geometric centre. Thus, the centre of gravity of the scraper cup is displaced from its geometric centre, and the effect of this on the pipeline pig is to impart to the latter a tendency to seek a given horizontal orientation, in which the centre of gravity of the scraper cup is positioned directly below its geometric centre.

5 Claims, 3 Drawing Figures

PATENTED OCT 23 1973 3,766,587
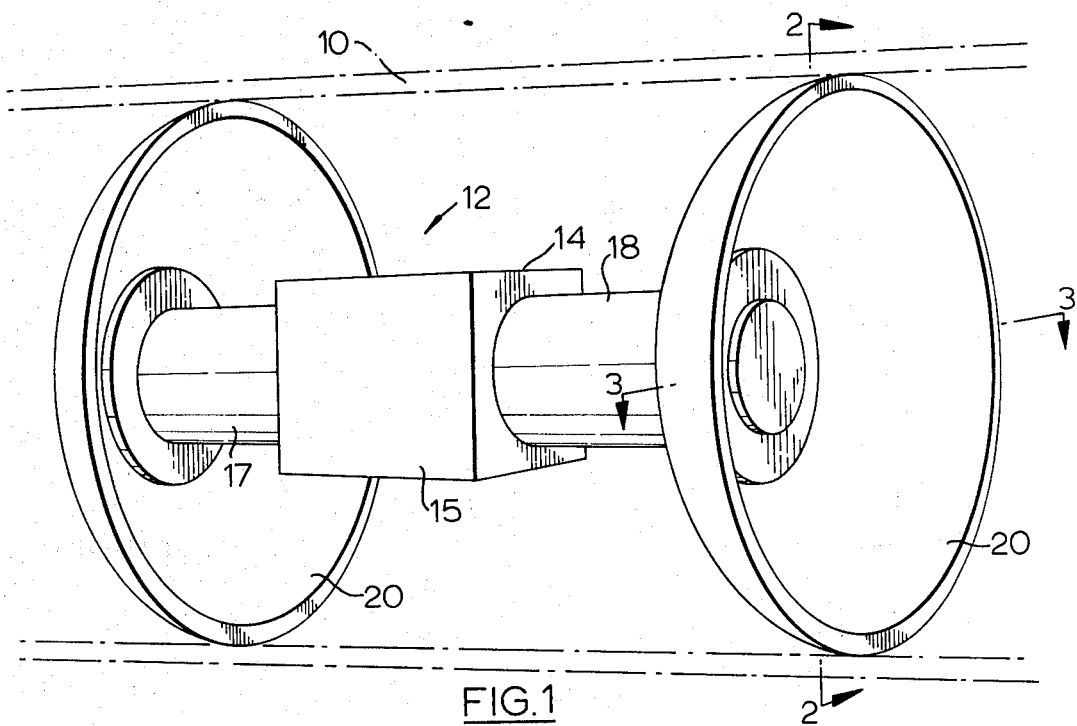
FIG.1
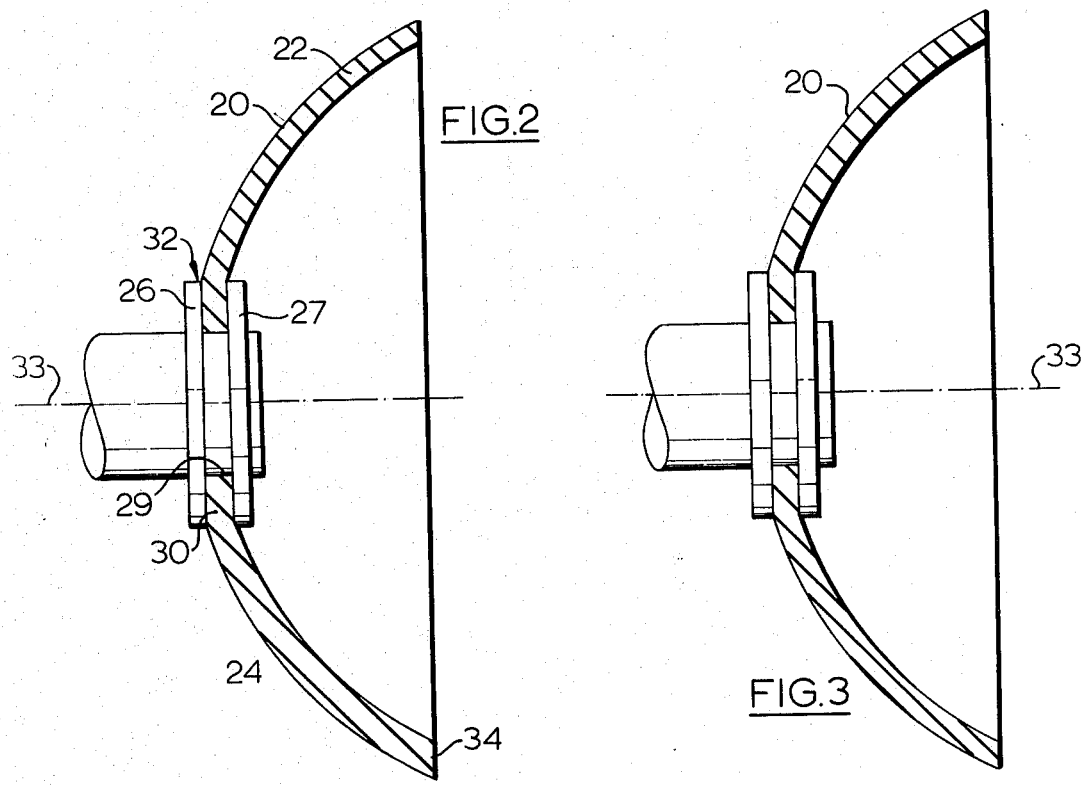
FIG.2
FIG.3

SCRAPER CUPS

This invention relates generally to pipeline pigs for fluid-conveying pipelines, and has to do particularly with the design of the scraper cups of a pipeline pig.

In the pipeline industry, fluids such as natural gas are conveyed over very long stretches in sections of pipeline which from time to time require checking and monitoring. Conventionally, pipeline pigs have been in use for a considerable length of time, and they are utilized to perform one or more of several functions. For example, one use of pipeline pigs is for cleaning or scraping out the interior of the pipeline, which can become corroded, scaly, etc. through long periods of use.

In its essential construction, the conventional pipeline pig includes an elongated body and two or more generally circular or cup-like scraper cups which are attached to the body at longitudinally separated points, and which flare outwardly in the same direction from the points of attachment to the pig body. Each scraper cup is made of resilient material, and completely fills the inside of the pipeline, so that the pressure of fluid being conveyed by the pipeline can push the pipeline pig along the pipeline in the direction of fluid flow. An important consideration in the present invention is the orientation of the pipeline pig as it traverses the section of pipeline. In many applications, such as cleaning, scraping, scouring, or simply the separation of two fluids passed sequentially through the same pipeline when it is undesirable for the fluids to mix at their interface, it is clear that the angular orientation of the pipeline pig is not important. It does not matter in these situations whether the pipeline pig gradually rotates as it moves or whether it remains in a single stable orientation with respect to the horizontal. Up to the present, most pipeline pig constructions have been generally radially symmetrical with the centre of gravity of the pipeline pig falling on its axis of symmetry, and thus falling centrally of the pipeline itself. Such a construction does not have a single stable orientation with respect to the horizontal, and its orientation would gradually wander in a random way as the pipeline pig traversed a section of pipeline.

With the increasing use of pipeline pigs to monitor and record pipeline characteristics, fluid flow conditions, and other parameters of pipeline operation, has come the necessity for utilizing specialized pigs adapted to carry specialized measuring instruments that are designed to operate at or near a single, stable horizontal orientation, or which are required to monitor only a single portion of the pipeline cross-section be it the uppermost point, the lowermost point or whatever.

Because, in many instances, the nature of the measuring instrumentation and/or the dimensional characteristics of the pipeline require that the pig body containing the instrumentation be located as close to the pipeline centre as possible, it is often not desirable to redesign the pipeline pig in such a way that the pig body itself has a centre of gravity eccentric with respect to the pipeline axis.

In view of the foregoing considerations, it is an object of this invention to provide a pipeline pig construction which is capable of maintaining itself in a single, stabilized horizontal orientation while being transported through a pipeline.

It is an object of a preferred embodiment of this invention to provide a pipeline pig construction which can achieve stable, horizontal orientation while permitting the pig body to be maintained at the pipeline axis.

Essentially, the foregoing objects are achieved through the design of a scraper cup for use with the pipeline pig, the scraper cup being generally cotyloid in shape and having its centre of gravity displaced from its geometric centre. More specifically, the scraper cup resembles a hollow spherical segment with a differential wall thickness, the wall thickness being greatest along one meridian and diminishing gradually around both sides to the antipodal meridian where the wall thickness is the least.

One embodiment of this invention is illustrated in the accompanying drawings, in which like numerals denote like parts throughout the several views, and in which:

FIG. 1 is a perspective view of a pipeline pig embodying this invention;

FIG. 2 is an axial sectional view of a portion of the pipeline pig of FIG. 1, taken along the line 2—2; and FIG. 3 is an axial sectional view of a portion of the pipeline pig shown in FIG. 1, taken along the line 3—3.

In FIG. 1, a pipeline 10 is shown in broken lines, and within the pipeline 10 is located a pipeline pig shown generally at 12. The pipeline pig includes a pig body 14 comprising a central portion 15 and two cylindrical extensions 17 and 18. At the distal end of each cylindrical extension 17 and 18 is a scraper cup 20. Both scraper cups 20 are identical, and only one will be described hereinafter. It is to be understood that more than two scraper cups can be utilized in the construction of a pipeline pig, and this invention is not to be considered limited by the number of scraper cups employed.

If the pipeline pig is adapted to carry measuring instrumentation, such instrumentation would be located within the pig body 14. No instrumentation has been shown in the drawings, because the nature, location, etc. of the instrumentation does not form a part of this invention. Indeed, it is not essential that the pipeline pig be one that carries instrumentation, since the necessity for a stable horizontal orientation could also arise through the requirement that a scouring or scraping pig be such as to scrape only a single portion of the cross-section of the pipeline. For example, many pipelines are constructed of pipe sections which are made by U-ing and O-ing and thus have a single longitudinal weld. Usually, the pipeline, when laid, is oriented with the weld at the top of the pipe. If it were desirable for a pipeline pig to carry out a grinding or smoothing operation on the weld alone, without increasing the frictional drag within the pipeline by scraping other portions of the cross-section of the pipe, then it would be essential that the pipeline pig be capable of maintaining a single, stable horizontal orientation.

FIG. 2 shows a vertical, axial section through the right-hand scraper cup 20, and in FIG. 2 it will be seen that the wall portion 22 at the top of the scraper cup 20 has generally a smaller thickness than the wall portion 24 at the bottom of the scraper cup 20. Although it would be possible to achieve a displacement of the centre of gravity of the scraper cup 20 simply by including a single enlarged-thickness portion in its lower part, or by adding high-density inserts at appropriate locations, the preferred embodiment of this invention has the wall thickness of the scraper cup gradually diminishing from its thickest point, which is at the bottom in FIG. 2, to its thinnest point, which is at the top in FIG. 2. The reason why this gradual diminution of thickness is preferred relates to the desirability of avoiding any sudden change in flexibility across the walls of the scraper cup. It will be understood that, due to the greater thickness of the bottom of the scraper cup in FIG. 2, the lower portion will be somewhat stiffer and less resilient than the upper part of the scraper cup, but this disparity in resilience is actually desirable because the upper portion of the pipe, in addition to the location there of the longitudinal weld, also has a greater incidence of weld icicles and certain other obstacles.

In general configuration, the scraper cup 20 illustrated in the drawing is part spherical with a circular edge, and can be described technically as a hollow spherical segment. Naturally, this particular configuration is not to be considered a limitation of the invention, since a large number of scraper cup contours are presently known and utilized in the industry. Generally, however, all scraper cup designs involve a generally thin-walled, flaring and cup-shaped contour, opening in the upstream direction in the sense of fluid flow.

The scraper cup 20 is maintained in position at the distal end of its respective cylindrical extension by means of two annular flanges 26 and 27, and in order to be accommodated between the annular flanges 26 and 27, the scraper cup 20 has a central circular opening 29 surrounded by an annular collar 30 which, though integral with the remainder of the scraper cup 20, is molded in the shape of a true annulus, lying in a single plane. Thus, the actual spherical or curvilinear contour of the scraper cup 20 begins at the location identified by the numeral 32, which is the outer limit of the annular collar 30.

Turning to FIG. 3, the scraper cup 20 is seen to have a uniform wall thickness along a horizontal plane passing through its axis of symmetry 33, the thickness increasing below, and decreasing above, the horizontal plane of FIG. 3.

A further advantage of the differential wall thickness in the scraper cup design disclosed herein relates to the fact that the lower section has greater strength and resilience than the upper section, due to its greater thickness, and thus is better able to support the weight of the instrument package in the pig body 14. At the same time, because both scraper cups have an eccentric centre of gravity, the effect is to lower the centre of gravity of the entire pig so that it is below the centre line of the pig.

Many conventional instrument pigs with their centres of gravity at the pipeline axis have required additional instrumentation to indicate the angular orientation of the pig, but this additional instrumentation can be dispensed with in the pig disclosed herein, since it may be assumed that the pig will seldom depart from its normal stable position, with the centre of gravity of the pig directly below the pipeline axis. Furthermore, it is pointed out that certain kinds of electronic equipment, such as wet-cell batteries, operate satisfactorily only in specified horizontal orientations, and for applications of this kind the pipeline pig disclosed herein is ideally suited.

In the manufacture of the scraper cup similar to that disclosed herein but having uniform wall thickness, the conventional method is to provide two mold-halves, one being a convex spherical mold surface, and the other being warping, concave spherical mold surface. The former has a radius of curvature slightly shorter than the radius of curvature of the latter, the difference corresponding to the desired wall thickness of the conventional scraper cup. In the conventional molding method, the two mold portions are arranged with their centres of curvature coincident, so that a uniform distance separates their surfaces. The scraper cup is then molded, and the result is a scraper cup with a uniform wall thickness.

In order to produce the scraper cup disclosed herein, it is merely necessary to arrange these same conventional mold-portions with their spherical surfaces adjacent one another, with their axes of symmetry substantially aligned, but with their centres of curvature separated in a direction transverse to the axes of symmetry by a distance less than the difference between their radii of curvature. Then, the scraper cup is molded between the mold-halves from a suitable resilient material in the plastic state. In this connection, it is to be noted that conventional material can be employed to manufacture the scraper cup disclosed herein. For example, rubber, polyurethane or other suitable resilient material may be employed.

Although this invention is not to be considered limited by considerations of dimensions or dimensional ratios, it may be pointed out that a satisfactory ratio between the least wall thickness (that at the uppermost point of the scraper cup 20 in FIG. 2) and the greatest thickness (that at the lowermost point on the scraper cup 20 in FIG. 2) is 1:2.

Naturally, the mold surfaces for molding the scraper cup are conventionally contoured in such a way that the annular collar 30, with its central circular opening 29, is an integral part of the scraper cup. In the cup-molding process disclosed herein, where the inner mold-half has its centre of curvature displaced from the centre of curvature of the outer mold-half in the direction transverse to the axes of symmetry of the mold-halves (i.e. in a direction parallel to the plane containing the annular collar 30 and the edge 34 of the scraper cup 20), either the outer mold-half or the inner mold-half or both will have to be reshaped slightly so that the outer periphery of the annular collar 30 falls at the same radial point in both mold-halves.

What I claim is:

1. A scraper cup of resilient material for use with a pipeline pig, the scraper cup being generally cotyloid with a substantially circular edge, the scraper cup having a greater wall thickness adjacent one portion of the circular edge than adjacent the antipodal portion of the circular edge, whereby the centre of gravity of the scraper cup is displaced from its geometric centre.

2. A scraper cup as claimed in claim 1, in which the scraper cup is a hollow spherical segment, the wall thickness being greatest along a meridian intersecting said one portion of the circular edge, and diminishing gradually around both sides to the antipodal meridian, where the wall thickness is the least.

3. A scraper cup as claimed in claim 2, in which there is provided a central axial aperture for the attachment of the scraper cup to the pipeline pig.

4. A pipeline pig, comprising:
   an elongated central body,
   and at least two similar scraper cups, each scraper cup being generally cotyloid in shape and having a greater wall thickness in one area than in others, whereby the centre of gravity of each scraper cup is displaced from its geometric centre, both scraper cups being attached to the central body at their geometric centres and both opening in the same direction.

5. A pipeline pig as claimed in claim 4, in which each scraper cup is a hollow spherical segment, the wall thickness of each being greatest along a meridian passing through said one area and diminishing gradually around both sides to the antipodal meridian, where the wall thickness is the least.

* * * * *